United States Patent

Koltgen

[15] 3,644,985
[45] Feb. 29, 1972

[54] PROCESS FOR PRODUCING PROBE HEADS, AND PROBE HEAD FOR INTERNAL COMPARISON MEASUREMENTS

[72] Inventor: Hermann Koltgen, Martin-Buber-Strasse 50, Darmstadt, Germany

[22] Filed: Aug. 21, 1969

[21] Appl. No.: 851,863

[30] Foreign Application Priority Data

Aug. 24, 1968 Switzerland ..........................12852/68

[52] U.S. Cl. ................................29/481, 29/480, 33/178 A
[51] Int. Cl. ..........................................................B23k 31/02
[58] Field of Search ..............33/143, 147, 148, 149, 178 A; 29/434, 480, 482, 481, 483; 138/89, 96

[56] References Cited

UNITED STATES PATENTS

| | | | |
|---|---|---|---|
| 1,889,974 | 12/1932 | Chamberlain | 29/483 |
| 3,367,020 | 2/1968 | Watson | 29/482 |
| 2,741,850 | 4/1956 | Reed | 33/178 |
| 2,563,984 | 9/1951 | Witchger | 33/178 |

*Primary Examiner*—John F. Campbell
*Assistant Examiner*—Victor A. DiPalma
*Attorney*—Michael S. Striker

[57] ABSTRACT

Process for producing probe heads for accurate instruments intended to be used for internal measurements and for gauging bores or other passages or cavities. The process comprises applying a closure member to the end of a tube, securing them together, forming a central longitudinal slit extending axially inwardly from the outer extremity of the closure member into the end of the tube adjacent the closure member, and forming the opposite end of the tube for attachment to a holder.

8 Claims, 6 Drawing Figures

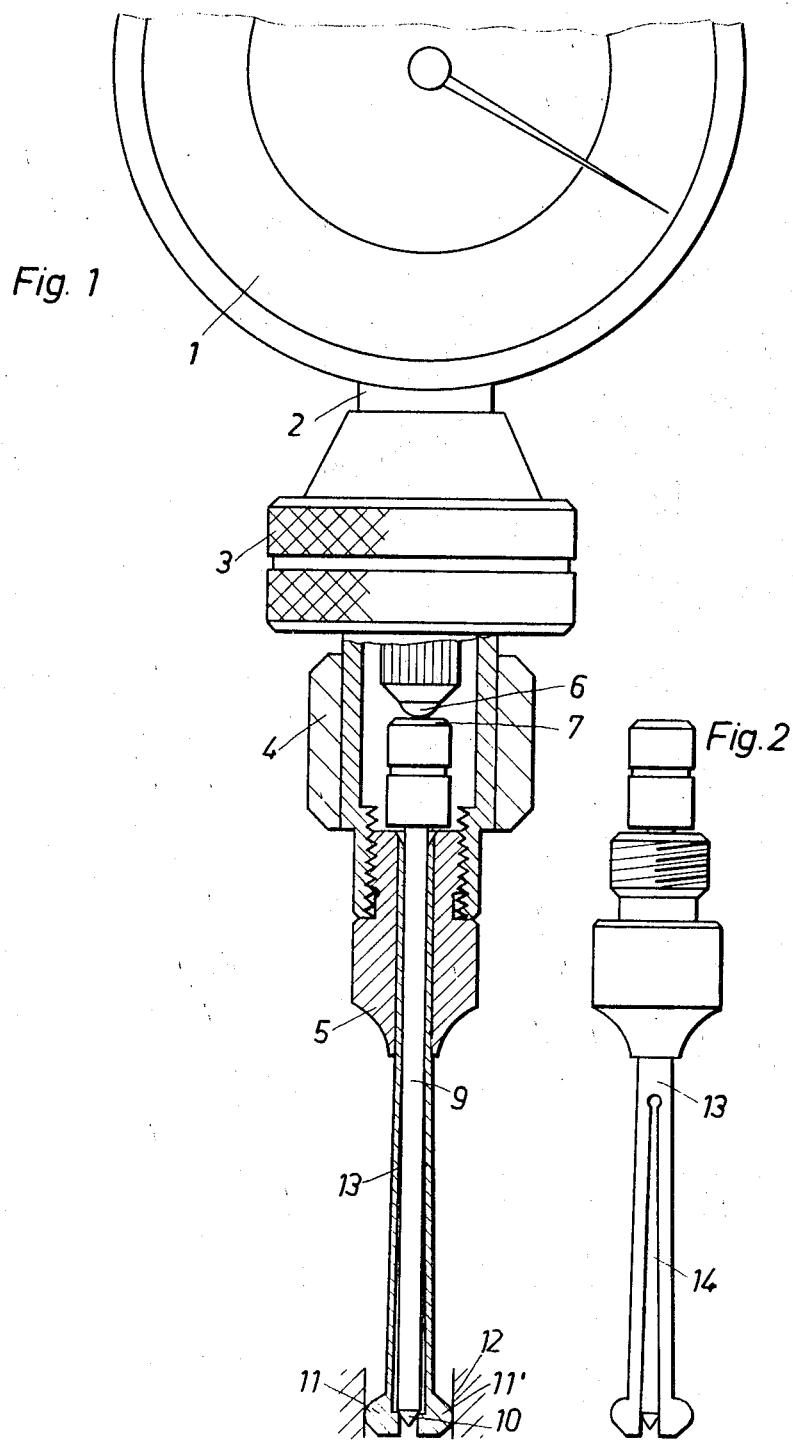

Inventor:
Hermann Költgen

Patented Feb. 29, 1972
3,644,985
3 Sheets-Sheet 3
Fig. 5
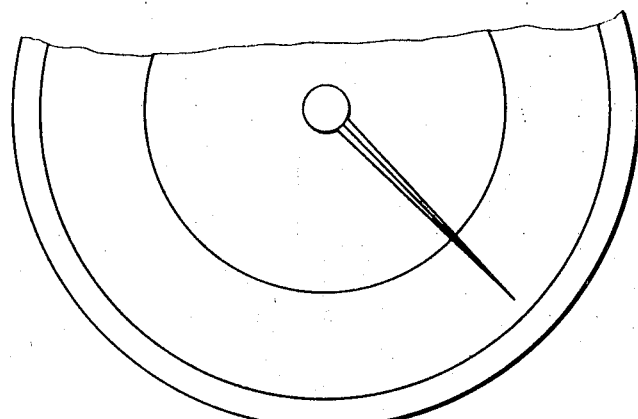
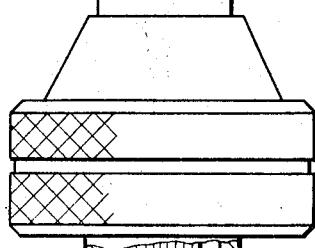
Fig. 6
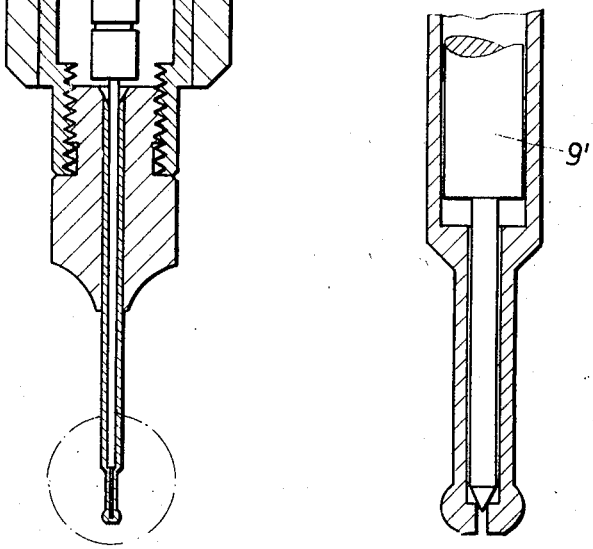
Inventor:
Hermann Költgen
by Michael J. Striker
Attorney

PROCESS FOR PRODUCING PROBE HEADS, AND PROBE HEAD FOR INTERNAL COMPARISON MEASUREMENTS

BACKGROUND OF THE INVENTION

The present invention is concerned with a method for producing accurate instruments intended to be used for internal measurements and for gauging bores or other passages or cavities.

Many types of such instruments are known and can be classified, in general, into at least three main types which are fixed gauges, such as limit gauges, leaf gauges, ball end gauges, and the like; directly indicating internal measuring instruments, such as internal micrometers, vernier gauges, clock gauges, and the like; indicating internal measuring instruments, such as probe heads, self-centering measuring heads, pneumatic measuring apparatus for internal measurements, and the like.

The invention is primarily concerned with the so-called two-point internal measuring instruments, also known as probe heads or expansion heads.

These probe heads are used on a large scale due to their great accuracy and ease of handling. The manufacture of such probe heads requires very precise workmanship in order to satisfy the requirement for the high precision expected of these measuring instruments.

SUMMARY OF THE INVENTION

An object of the invention is to provide a new method of manufacturing a probe head which comprises applying a closure member, preferably by means of a sleeve connection, to the end of a tube, securing them together, forming a central longitudinal slit extending axially inwardly from the outer extremity of the closure member into the end of the tube adjacent the closure member, and preferably forming the opposite end of the tube for attachment to a holder.

The invention also includes, amongst others, the following features, used either singly or in combination, viz: forming the closure member, before it is slit, as a solid figure of revolution; shaping the meeting surfaces of the closure member and the tube end so that their cooperating surfaces lie accurately in a plane perpendicular to the axis of the tube; forming the sleeve joint between the closure member and the tube so that the latter fits within a recess in the closure member; or alternatively, forming the closure member with an extension or stem which is fitted into the end of the tube; also making the provision that the stem or extension, in the immediate vicinity of the tube end, is of reduced diameter in order to provide a shoulder with which the end of the tube will abut.

Conveniently the tube as well as the closure member are made from metal capable of hardening and both parts are attached by soldering.

Advantageously both the closure member and tube are hardened simultaneously after attachment to each other. It is advantageous to grind the closure member concentrically after hardening.

The novel features which are considered as characteristic of the invention are set forth in particular in the appended claims. The improved probe head itself, however, both as to its construction and the method of manufacturing, together with additional features and advantages thereof, will be best understood upon perusal of the following detailed description of certain specific embodiments with reference to the accompanying drawings.

BRIEF DESCRIPTION OF THE DRAWINGS

FIG. 1 is a partly sectional view of a measuring device with an indicator dial holder and probe head according to the invention;

FIG. 2 is an elevational view of the probe head according to FIG. 1;

FIG. 5 is a partly sectional view of a measuring device with an indicator dial holder and a further embodiment of the probe head according to the invention; and FIG. 6 is a sectional view, on an enlarged scale, of a constructional detail of the probe head according to FIG. 5.

DESCRIPTION OF THE PREFERRED EMBODIMENTS

Figure 3:
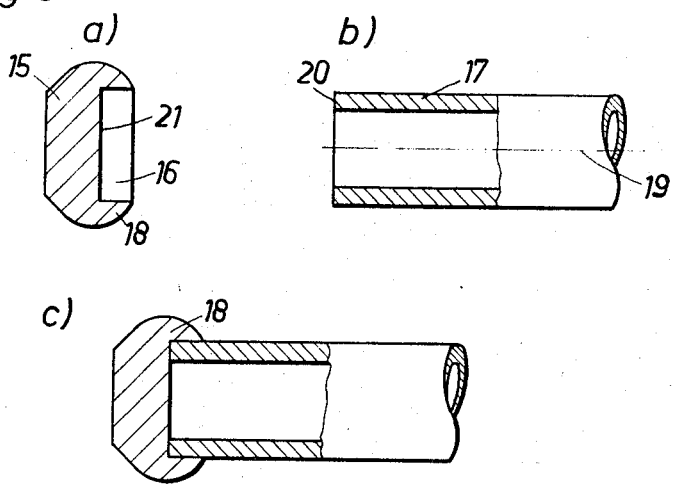
FIG. 3 is a mainly axial sectional view of embodiments of the constructional elements of one form of a probe head according to the invention.

In FIG. 1 a bore comparator is shown consisting of an indicator dial 1, the support or shaft 2 of which is held firmly in position by a tensioning nut 3 in an indicator dial holder 4. A probe head 5 according to the invention is shown held within the holder 4. The actuator bolt 6 of the indicator dial presses against the upper end 7 of an actuator rod 9 located within the probe. The conical end 10 of rod 9 expands the two probe faces 11 and 11' apart until they come into contact with the bore wall 12 (i.e., the bore to be measured or gauged) as indicated in the Figure. The measurements of the conical end 10 are designed to translate the expansion into a longitudinal displacement of the actuator rod 9 in the ratio 1:1, thereby transferring the expansion to the indicator dial.

The probe head 5, as clearly shown in FIGS. 1 and 2, has a substantially hollow shaft 13 having an axial slit 14 and an actuator rod 9.

The invention is based on the consideration that production costs of the probe heads can be substantially reduced if the precision work involved in the comparatively long, narrow boring of the shaft could be omitted. In order to achieve this objective, the probe head hitherto made from a precision-turned part is now assembled from several parts formed in such a way as to allow separate production at comparatively low cost but having very high precision, which can be assembled afterwards by simple means but with great exactness.

FIG. 3a shows the closure member 15 manufactured as a mass-produced or pressed article in its final shape. It is formed with a cylindrical bore 16 into which is inserted the end of a seemless tube 17 illustrated in FIG. 3b. That part of the closure member exhibiting an annular enlargement 18 encloses the end of the tube 17. The tube has a level front surface 20 which is perpendicular to the axis 19 of the tube and which will be brought into snug contact with the corresponding counter surface 21 at the bottom of the bore of member 15. The parts are assembled in a very exact fit, as indicated in FIG. 3c, and are soldered together.

Figure 4:
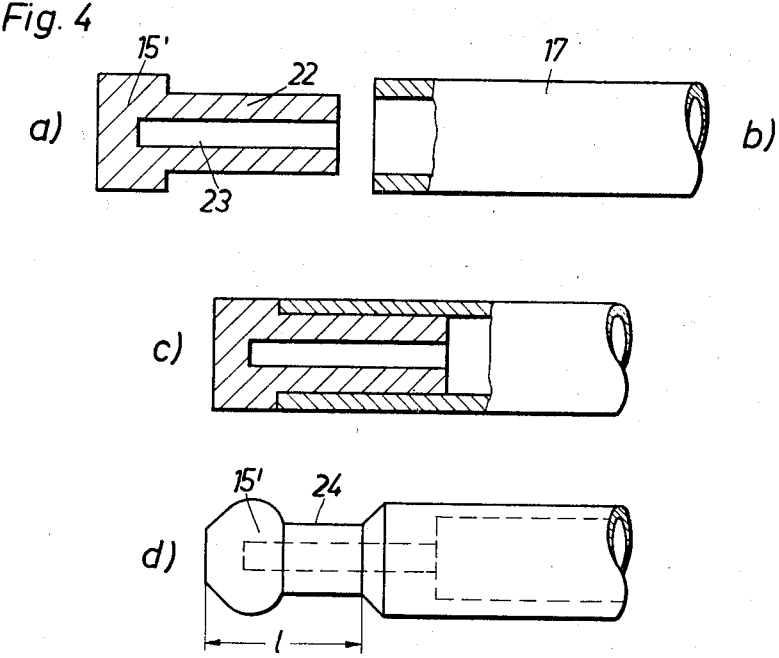
FIG. 4 is a mainly axial sectional view of different embodiments of the constructional elements of a probe head, FIG. 4d being an elevational view.

FIG. 4 serves to illustrate a variant of the production process described with reference to FIG. 3. The closure member 15 — represented in FIG. 4a — is made as a turned piece, and possesses a stemlike turned portion 22 which is provided with a central narrow bore 23. For the measurement of a bore of about 0.5 mm. the diameter of the bore 23 amounts to 0.28 mm. in a practical probe head.

The tube 17 indicated in FIG. 4b is pushed over the plug 22 as indicated in FIG. 4c, and the parts are then soldered together. The tube and a part of the cylindrical plug 22 are now removed by grinding, in a single operation, of the closure member 15 — the surface of which is formed like a ball — and also at 24, so that the form shown in FIG. 4d is obtained. The length of the plug which has been thinned down by this grinding depends on the desired probing depth of the finished probe head; the distance 1 for the usual forms of small probe heads amounts to between 1.5 and 3 mm.

By means of the probe head according to the invention the possibility is provided for the first time to carry out internal comparison measurements in comparatively deep narrow bores. By this means a new field of application is opened for this measuring process, and the advantages of this proven measuring process can also be used under measuring conditions where this has up to now not been practical.

FIG. 5 shows a bore comparator according to FIG. 1, however with a measuring head according to FIG. 4.

FIG. 6 shows, in cross section, on an enlarged scale as compared with FIG. 5, constructional details of the end of the probe head of FIG. 5. In this embodiment a stepped actuator rod 9' is used, the thinner end of which protrudes into the bore of the closure member.

It will be appreciated that, in both forms shown in the drawings, after the slit has been formed the head or closure member provides an internally extending shoulder against the edge of which the extremity of the actuator rod will cooperate as shown in FIG. 1. In fact, after slitting, each half of the head or closure member will be formed with a substantially semiannular shoulder.

I claim:

1. A method of making a probe head, comprising the steps of providing a tubular member having an open end bounded by an annular end face extending normal to the axis of said tubular member; providing a closure member for said open end with an abutment face for said end face; positioning said closure member on said tubular member so that it closes said open end and said abutment face covers and contacts said end face; soldering said members to one another to connect them as a unit; forming said unit with a central slit extending through said closure member and into said tubular member axially of the latter; hardening said members simultaneously; and grinding said closure member to a final desired shape.

2. The method according to claim 1 in which said members are interconnected by a sleeve joint.

3. The method according to claim 2, which includes forming the sleeve joint so that said tubular member fits within a recess in the closure member.

4. The method according to claim 1, which includes forming the closure member with an extension which is fitted within the open end of the tubular member.

5. The method according to claim 4, which includes shaping said extension to a reduced diameter in order to provide shoulder against which the tube end will abut.

6. The method according to claim 4, which includes reducing the diameter of the tubular member immediately in the vicinity of the closure member to provide a reduced neck portion.

7. The method according to claim 6, in which an annular zone of the extension is also removed where the reduced neck is formed.

8. The method according to claim 1, which includes shaping said faces so that they lie accurately in planes normal to the axis of said tubular member.

* * * * *